(12) United States Patent
Schiltz et al.

(10) Patent No.: US 12,175,654 B2
(45) Date of Patent: Dec. 24, 2024

(54) SURFACE INSPECTION SYSTEM AND METHOD FOR DIFFERENTIATING PARTICULATE CONTAMINATION FROM DEFECTS ON A SURFACE OF A SPECIMEN

(71) Applicant: Carl Zeiss Industrial Metrology, LLC, Maple Grove, MN (US)

(72) Inventors: Drew Schiltz, Maple Grove, MN (US); Marcin Bauza, Plymouth, MN (US); Acasia Wickett, Champlin, MN (US); Nathaniel Roisen, Minneapolis, MN (US)

(73) Assignee: Carl Zeiss Metrology LLC, Maple Grove, MN (US)

( * ) Notice: Subject to any disclaimer, the term of this patent is extended or adjusted under 35 U.S.C. 154(b) by 391 days.

(21) Appl. No.: 17/520,354

(22) Filed: Nov. 5, 2021

(65) Prior Publication Data
US 2022/0148145 A1    May 12, 2022

Related U.S. Application Data

(60) Provisional application No. 63/110,409, filed on Nov. 6, 2020.

(51) Int. Cl.
*G06T 7/00*       (2017.01)
*G01N 21/95*      (2006.01)

(52) U.S. Cl.
CPC .............. *G06T 7/001* (2013.01); *G01N 21/95* (2013.01); *G06T 2207/10016* (2013.01); *G06T 2207/10152* (2013.01); *G06T 2207/30164* (2013.01)

(58) Field of Classification Search
CPC ........... G06T 7/001; G06T 2207/10016; G06T 2207/10152; G06T 2207/30164; G01N 21/95
See application file for complete search history.

(56) References Cited

U.S. PATENT DOCUMENTS

| | | | |
|---|---|---|---|
| 5,798,829 A | 8/1998 | Vaez-Iravani | |
| 5,969,372 A | 10/1999 | Stavely et al. | |
| 6,465,801 B1 | 10/2002 | Gann et al. | |
| 7,355,193 B2 | 4/2008 | Gann et al. | |

(Continued)

FOREIGN PATENT DOCUMENTS

WO    2019012404 A1    1/2019

*Primary Examiner* — Hung V Nguyen
(74) *Attorney, Agent, or Firm* — Ewers IP Law PLLC; Falk Ewers

(57) ABSTRACT

A system for differentiating particulate contamination from defects on a surface of a specimen includes an illumination source configured to illuminate the specimen with a light at a predetermined angle relative to the surface of the specimen, an image recording device configured to capture the light reflected from the surface of the specimen in a sensor image, and an evaluation unit configured to receive deflectometry or phase-shifted deflectometry (PSD) image data and dust channel image data from the image recording device, correlate the PSD image data and dust channel image data, and separately output first result information and second result information, the first result information including defect identification information and defect location information and the second result information including contamination identification information and contamination location information.

11 Claims, 8 Drawing Sheets

(56) References Cited

U.S. PATENT DOCUMENTS

| | | |
|---|---|---|
| 7,426,023 B2 | 9/2008 | Ohshima et al. |
| 7,702,236 B2 | 4/2010 | Steinberg et al. |
| 7,916,287 B2 | 3/2011 | Matsui et al. |
| 8,508,727 B2 * | 8/2013 | Uto ............... G06T 7/0004 |
| | | 356/237.4 |
| 10,267,745 B2 | 4/2019 | Otani et al. |
| 10,416,088 B2 * | 9/2019 | Duffy ................ H01J 37/26 |
| 10,436,576 B2 * | 10/2019 | Minekawa ...... G02B 21/0092 |
| 10,598,604 B1 * | 3/2020 | Schiltz ............. G01N 21/8806 |
| 2003/0179369 A1 | 9/2003 | Feldman et al. |
| 2008/0198602 A1 | 8/2008 | Brittain et al. |
| 2010/0290694 A1 | 11/2010 | Dubois et al. |
| 2014/0043602 A1 | 2/2014 | Engel |
| 2017/0227471 A1 | 8/2017 | Cilip et al. |
| 2023/0175982 A1 * | 6/2023 | Honda ............. G01N 21/8851 |
| | | 356/446 |

* cited by examiner

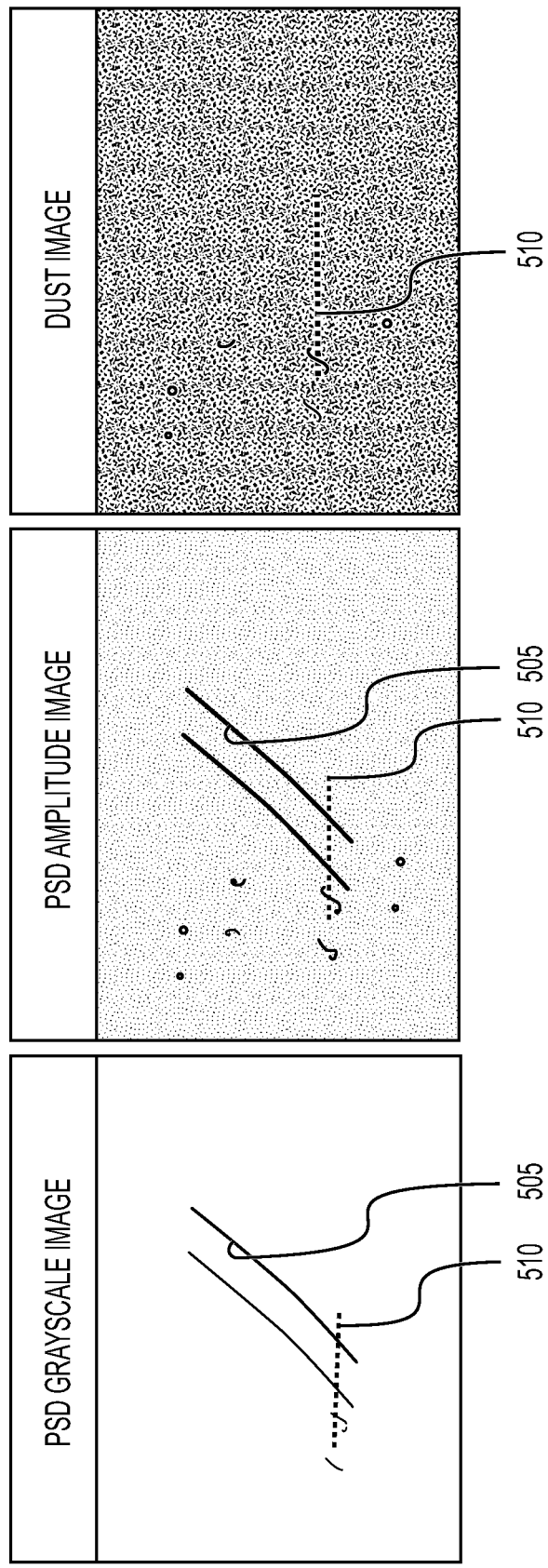

SURFACE INSPECTION SYSTEM AND METHOD FOR DIFFERENTIATING PARTICULATE CONTAMINATION FROM DEFECTS ON A SURFACE OF A SPECIMEN

CROSS REFERENCE TO RELATED APPLICATIONS

This application claims priority to U.S. provisional patent application 63/110,409, filed Nov. 6, 2020, the entire content of which is incorporated herein by reference.

TECHNICAL FIELD

The disclosure relates to a system and a method for optically inspecting a surface of a specimen, and in particular to a surface inspection system and a method for differentiating particulate contamination from defects on a surface of a specimen to be inspected.

BACKGROUND

White light surface inspection systems have been developed for high throughput and highly automated manufacturing of products with decorative and technical surfaces. It is also possible to realize such light surface inspection systems with lights of different colors and to use the phase differences of the colors for the analysis. These systems facilitate a high degree of sensitivity to even the smallest changes in form and gloss level on a myriad of types of surfaces and finishes.

Typical surface inspection systems need to be robust in high-throughput and highly automated manufacturing. The core technology facilitates a high degree of sensitivity to even the smallest changes in form and gloss level on a myriad of types of surfaces and finishes. The surface inspection systems are systems with an integrated robot for manipulating the part through the inspection cell and positioning the part for various images to be recorded on the part.

The core technology behind utilized in such typical surface inspection systems is phase-shifted deflectometry (PSD). The basis for this technique requires 3 components: 1) the surface to inspect that is at least partially glossy 2) an illumination unit that will display sinusoidal spatial profiles and 3) one or more cameras to capture the light from the illumination unit that is reflected or scattered from the surface to inspect. For illumination, LED arrays and diffusers are provided that allow custom illumination patterns to be generated with unique spatial intensity profiles. However, other light sources can also be used for illumination.

A conventional PSD setup 100 is shown in FIG. 1. The setup includes a surface 110 of an object under test, a pattern area 120 generated by an illumination unit (not shown), a camera 130, and an image evaluation unit 140 with a display. The camera 130 sequentially takes a plurality of images of the reflected pattern area, which are subsequently evaluated by the image evaluation unit 140. The only difference between each acquisition is the illumination condition. The pattern on the tunnel shifts by $n*2Pi/n_{tot}$, where n is the $n^{th}$ acquisition and $n_{tot}$ is the total number of acquisitions in the sequence.

The phase-shifted deflectometry setup shown in FIG. 1 requires the illumination unit, the camera, and the surface of the object under test to be in a fixed spatial location to each other while the plurality of images is taken by the camera.

A conventional device for optically inspecting a surface of a sample to determine quality parameters of a product and to identify surface defects based on white light phase-shifted deflectometry is described, e.g., in U.S. Patent Application Publication No. 2017/0227471. The device includes a screen which provides profile patterns with areas that form spatial light intensity profiles and a curved mirror arranged between the screen and a holder for providing a second light profile pattern. Like the setup shown in FIG. 1, the device described in U.S. Patent Application Publication No. 2017/0227471 requires an image recording device to record a plurality of images to determine properties of the surface of the sample.

The setup shown in FIG. 1 begins to exhibit serious limitations when there is dust or fiber or particulate contamination present on the part during inspection. Although deflectometry in general is very efficient in determining imperfections on the surface of the part to be inspected, when the surface is contaminated with dust or other particles, the dust or particles may be falsely recognized as defects. Such a situation arises because within the phase-shifted image dataset overlying particles can be nearly indistinguishable from real defects on the surface. Even by employing deep learning algorithms with the sole intent of creating this separation, only moderate performance increases have been observed.

SUMMARY

It is therefore an object of the present disclosure to provide an improved surface inspection system and a method for differentiating particulate contamination from defects on a surface of a part to be inspected to correctly identify surface defects to reduce overkill coming from particulates in the automated inspection process.

The object is achieved by a system and a method for differentiating particulate contamination from defects on a surface of a part to be inspected as described herein.

The system collects image data employing the techniques of deflectometry or PSD. In the case of deflectometry, only one deflectometry image is taken and in the case of PSD, a plurality of deflectometry images are taken. After data collection, analysis for surface defects is performed utilizing various types of algorithms. The system classifies parts as either acceptable (OK) or defective (NG). There are two key performance metrics that are measured by comparing with visual inspectors: escape and overkill.

As an example, escape might be defined by the following formula:

$$\text{Escape} = \frac{\text{Number of OK Parts}}{\text{Visual Inspector Total } NG \text{ Parts}}$$

As an example, overkill might be defined by the following formula:

$$\text{Overkill} = \frac{\text{Number of } NG \text{ Parts}}{\text{Visual Inspector Total OK Parts}}$$

One of the more challenging aspects of evaluation tuning is the simultaneous minimization of escape and overkill. In the event where dust and fiber contamination are present on the part during inspection the complexity of this tuning intensifies greatly, even to the point where an acceptable solution may not be achievable.

According to an aspect of the disclosure, the object is achieved by providing techniques for collecting a further channel of information in addition to the PSD channel to correctly identify surface particles to reduce overkill in the automated inspection process which results in a reduction of false positives in detecting defects.

In particular, an inspection system for differentiating particulate contamination from defects on a surface of a specimen is provided. The inspection system includes an illumination source configured to illuminate the specimen with a light at a predetermined angle relative to the surface of the specimen, an image recording device configured to capture the light reflected from the surface of the specimen in a sensor image to generate PSD image data and dust channel image data, a controller in communication with the illumination source and the image recording device and configured to receive the PSD image data and the dust channel image data from the image recording device, correlate the PSD image data and the dust channel image data, and separately output first result information and second result information, the first result information including defect identification information and defect location information and the second result information including contamination identification information and contamination location information.

According to an aspect of the disclosure, the PSD image data includes a plurality of deflectometry images, and the dust channel image data includes a dust image. The controller is further configured to control the image recording device to capture the deflectometry images in a sequence and to capture the dust image at a predetermined point in time during the sequence.

According to a further aspect of the disclosure, the controller is configured to at least one of control the image recording device to capture the deflectometry images before capturing the dust image, and control the image recording device to capture the deflectometry images subsequent to capturing the dust image.

According to yet another aspect of the disclosure, the PSD image data includes a plurality of deflectometry images, and the dust channel image data includes a plurality of dust images, and the controller is further configured to control the image recording device to capture the deflectometry images in a sequence and to capture one of the plurality of dust images between any of the plurality of deflectomentry images.

According to an aspect of the disclosure, the image recording device includes a plurality of cameras, and the plurality of cameras is configured as at least one of area scan cameras and line scan cameras. When the plurality of cameras is configured as the area scan cameras, the specimen is held in a static position when the light reflected from the surface of the specimen is captured, and when the plurality of cameras is configured as the line scan cameras, the specimen is moved with a stage or a robot.

The illumination source includes a plurality of light sources, and to generate the dust channel image data, one or more light sources of the illumination source is/are configured to illuminate the specimen at at least one glancing angle which produces glancing angle illuminations to the surface of the specimen to induce particles to glow.

According to yet another aspect of the disclosure, the plurality of light sources is an array of light sources, and the one or more light sources are selected from the array of light sources.

The object is further achieved by a method for differentiating particulate contamination from defects on a surface of a specimen, the method including illuminating the specimen with a light at a predetermined angle relative to the surface of the specimen, capturing the light reflected from the surface of the specimen in a sensor image to generate PSD image data and dust channel image data by an image recording device, receiving PSD image data and dust channel image data from the image recording device, correlating the PSD image data and dust channel image data, and separately or together outputting first result information and second result information, the first result information including defect identification information and defect location information and the second result information including contamination identification information and contamination location information.

According to an aspect of the disclosure, the PSD image data includes a plurality of deflectometry images, and the dust channel image data includes a dust image, and the method further includes controlling the image recording device to capture the deflectometry images in a sequence and to capture the dust image at a predetermined point in time during the sequence.

The method further includes controlling the image recording device to capture the deflectometry images before capturing the dust image and controlling the image recording device to capture the deflectometry images subsequent to capturing the dust image.

According to another aspect of the disclosure, the PSD image data includes a plurality of deflectometry images, and the dust channel image data includes a plurality of dust images, and the method further includes controlling the image recording device to capture the deflectometry images in a sequence and to capture one of the plurality of dust images between any of the plurality of deflectomentry images.

According to yet another aspect of the disclosure, the image recording device includes a plurality of cameras, the plurality of cameras is configured as at least one of area scan cameras and line scan cameras. When the plurality of cameras is configured as the area scan cameras, the specimen is held in a static position when the light reflected from the surface of the specimen is captured, and when the plurality of cameras is configured as the line scan cameras, the specimen is moved with a stage or a robot.

According to an aspect of the disclosure, a non-transitory computer readable storage medium is provided which is encoded with a program code stored thereon that when executed by a processor, causes the processor to illuminate the specimen with an illumination source with a light at a predetermined angle relative to the surface of the specimen, capture the light reflected from the surface of the specimen in a sensor image to generate PSD image data and dust channel image data by an image recording device, receive PSD image data and dust channel image data from the image recording device, correlate the PSD image data and dust channel image data, and separately or together output first result information and second result information, the first result information including defect identification information and defect location information and the second result information including contamination identification information and contamination location information.

According to another aspect of the disclosure, the PSD image data includes a plurality of deflectometry images, and the dust channel image data includes a dust image, and the program code further causes the processor to control the image recording device to capture the deflectometry images in a sequence and to capture the dust image at a predetermined point in time during the sequence.

According to a further aspect of the disclosure, the program code further causes the processor to control the image recording device to capture the deflectometry images before capturing the dust image and control the image recording device to capture the deflectometry images subsequent to capturing the dust image.

According yet another aspect of the disclosure, the PSD image data includes a plurality of deflectometry images, and the dust channel image data includes a plurality of dust images, and the program code further causes the processor to control the image recording device to capture the deflectometry images in a sequence and to capture one of the plurality of dust images between any of the plurality of deflectomentry images.

BRIEF DESCRIPTION OF THE DRAWINGS

The disclosure will now be described with reference to the drawings wherein:

FIGS. 5A to 5C show experimental image data comparing PSD image data to dark field dust channel image data.

DESCRIPTION OF EXEMPLARY EMBODIMENTS

Identical reference signs hereinafter designate elements having identical or similar technical features.

Figure 1:
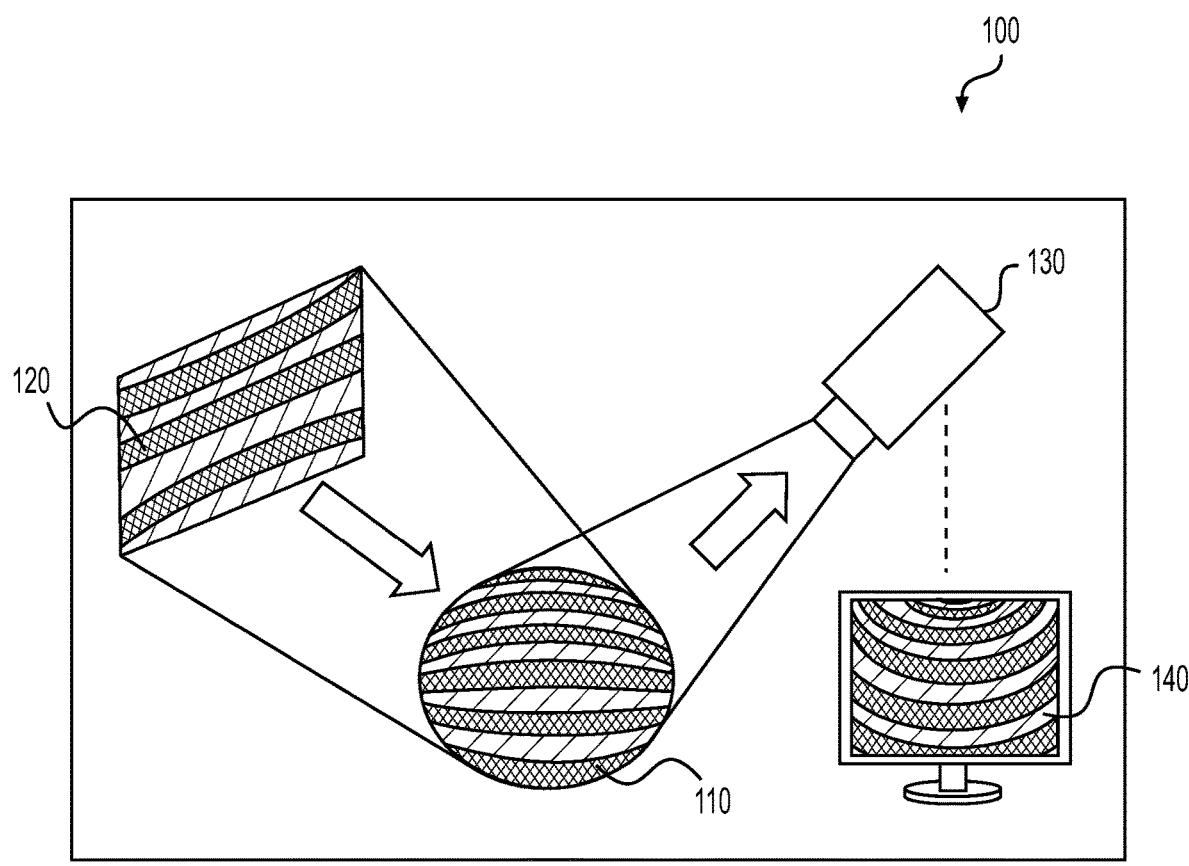
FIG. 1 shows a schematic illustration of a conventional phase-shifted deflectometry setup.
Figure 2:
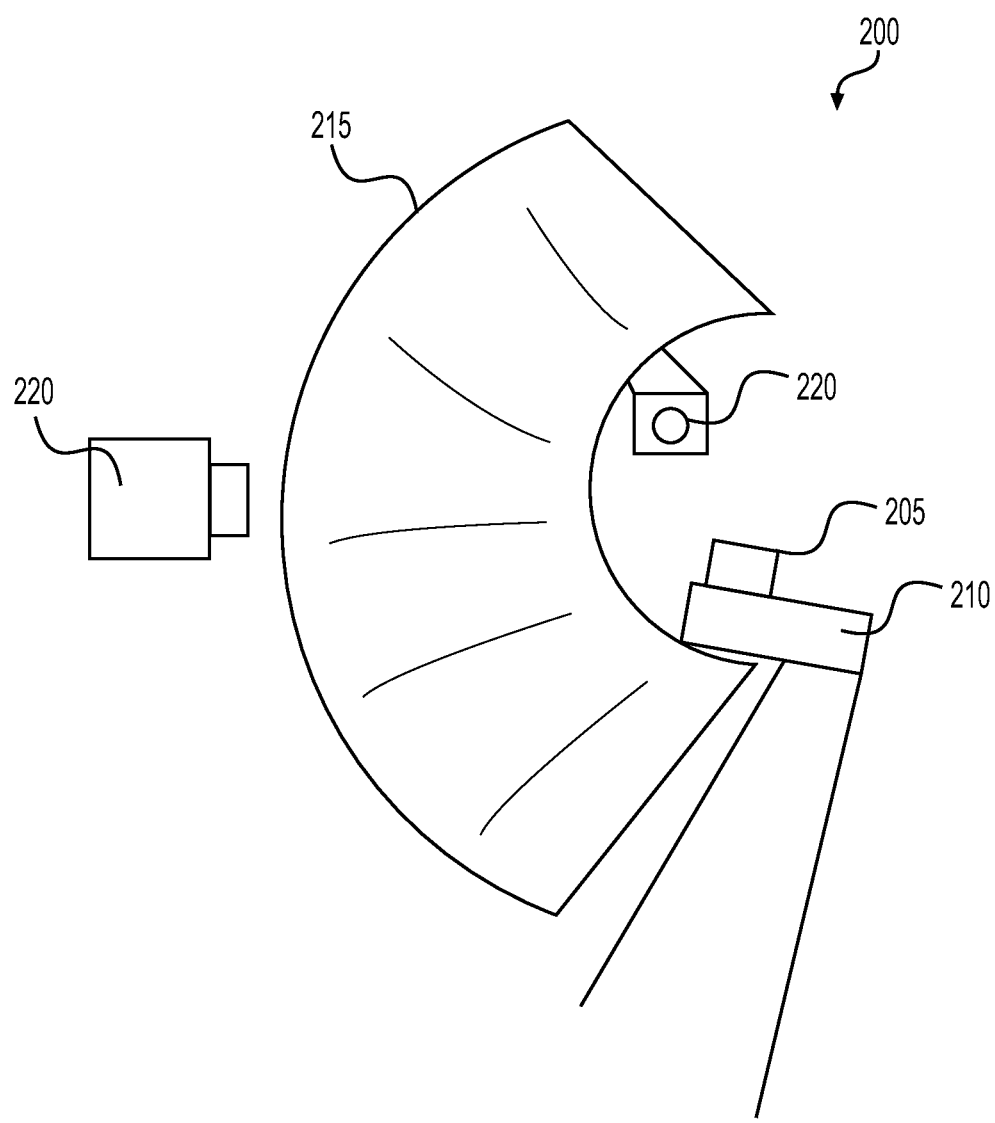
FIG. 2 shows a schematic illustration of a perspective view of a surface inspection system according to an exemplary embodiment of the disclosure.

FIG. 2 shows a schematic illustration of a perspective view of a surface inspection system 200 for optically inspecting a surface of a specimen 205. The surface inspection system 200 includes a carrier element 210 and a tube member 215. The carrier element 210 can be moved to move the specimen 205 into the interior room of the tube member 215.

The surface inspection system 200 further includes an image recording device or imaging sensor 220 and an array of light sources 225. The image recording device 220 may include one or more cameras and the one or more cameras may be configured as area scan cameras or line scan cameras, for example. However, the image recording device 220 is not limited thereto. Any type of image recording device is possible.

The system 200 further includes an evaluation unit or controller (not shown). The evaluation unit includes a non-transitory computer readable storage medium with program logic and program code stored thereon. In addition, the evaluation unit includes a processor in communication with the non-transitory computer readable storage medium, with the image recording device 220 and with the array of light sources 225 to control the image recording device 220 and the array of light sources 225. Further, the evaluation unit may be in communication with any additional or other light source and recording unit and with any robot or other carrier (not shown) that may be provided to move the specimen 205 relative to the array of light sources 225 and to the image recording device 220.

Images may be recorded with the image recording system 220 configured as an area scan camera while the part is held in static position within the tube member 215 or with the image recording device 220 configured as a line scan camera where the part is precisely manipulated through the inspection system with a stage or robot (not shown). After a plurality of images are taken, post-calculated images can then be generated, including main grayscale, phase and amplitude channels. The grayscale channel is simply the average of the raw images. The amplitude channel carries information about changes in gloss on the surface. The phase is a direct measurement of the slope on the surface of the part. Fully utilizing all the information from these post-calculated image sets, algorithms are then developed to find irregularities based on scattering qualities of an anomaly or physical changes in depth on the surface. Sensitivity to tens of nanometers in depth on the surface is commonplace, making such a system ideal for inspection of defects such as dents, bumps, scratches, waviness and orange peel.

The tube member 215 may form a U-shape tunnel and may be provided with the array of light sources 225, such as an array of light emitting diodes (LEDs). However, the tunnel may have many other shapes, such as an oval shape, a shape of an ellipse, a hexagon, or an octagon. The array of light sources 225 may form a display. Each of the LEDs forms a pixel which can be programmed and controlled independent from one another. However, any other type of light source is possible, including flat panels, etc.

To determine defects, a pattern of fringes is generally created by the light sources and the surface of the specimen 205 is illuminated with the pattern of fringes or stripe, for example. Any other light pattern is possible. The pattern of fringes is reflected from the surface of the specimen 205 and a plurality of deflectometry images are taken by the image recording system 220 at different lightning conditions. The image data of the deflectometry images may form the deflectometry or PSD input 605 shown in FIG. 6 and discussed below. Each time, a new deflectometry image is taken, the fringes or stripes, i.e., the pattern is shifted by a small phase, for example. It is also possible to change the widths of the fringes or stripes.

After the image data of the deflectometry images is taken, post-calculated images can be generated, including images for main grayscale, phase, and amplitude channels. The grayscale channel represents an average light intensity of the plurality of images. The amplitude channel carries information about changes in gloss on the surface. The phase is directly comparable to the slope of the surface of the object.

In conventional systems, by fully utilizing all of the information from these post-calculated image sets, algorithms find irregularities based on scattering qualities of an anomaly or physical changes in depth on the surface. Other techniques can be employed with which it is also possible to rely on only one deflectometry image for post-calculation.

However, a significant drawback of conventional deflectometry systems is that if the surface of the specimen 205 is not clean, i.e., if the surface of the specimen 205 is contaminated with dust or fiber particles, for example, the conventional deflectometry system may falsely recognize the dust or other contamination particle as a defect.

Figure 6:
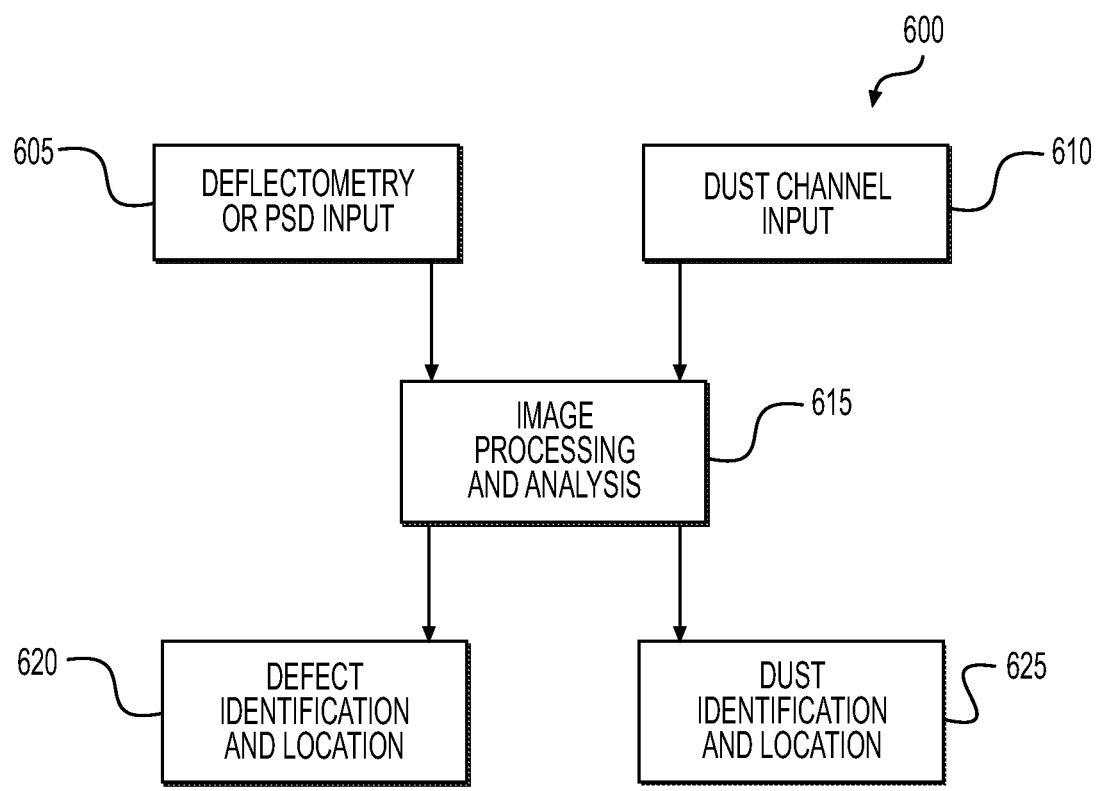
FIG. 6 shows a flow chart of a method for differentiating particulate contamination from defects on a surface of a specimen to be inspected according to an exemplary embodiment of the disclosure.

For the purpose of identifying dust and fiber particles on the surface of the specimen 205, a dark field imaging technique may be employed to generate an extra channel of information, also referred to as dust channel input 610 in FIG. 6. This sequential channel of information is collected during the same data acquisition sequence for PSD, yielding pixel accurate reference to the PSD dataset and only marginally increasing data acquisition time.

To obtain the image data for the dust channel input 610, one or more light sources are turned on that produce glancing angle illuminations (i.e., illuminations at one or more respective glancing angles) to the surface of the specimen 205 being inspected and far away from the specular reflection that would be observed by the image recording system 220. These light sources may be selected from the array of light sources 225. However, it is also possible to provide extra light sources that are independent from the array of light sources 225 to obtain the image data for the dust channel input 610.

If the light sources are selected from the array of light sources 225, only LEDs are turned on, that will produce a glancing angle illumination to the surface of the specimen 205 being inspected and that would be observed by the image recording system 220. While the array of light sources 225 has a curved design, any other configuration of the light source(s) for recording the "dust" channel image is possible. For example, the light source could be formed by totally flat panels, by a single source LED, or any other light source as long as it shines the light at a predetermined angle on the surface of the specimen 205 to induce glow of the particulates.

In other words, when recording the "dust" channel image, the selected light sources shine a light under a predetermined angle on the surface of the specimen 205 and the image recording system 220 is arranged at a predetermined angle relative to the surface of the specimen 205 and takes an image which results in a "glowing" of the contamination particle on the surface of the specimen that can be observed.

Thus, this illumination condition produces high signal in the image recorded by the image recording system 220 for dust or any other contamination particles sitting on top of the surface of the specimen 205 because of the high scattering angles that are produced. However, both dimensional and gloss related defects typically do not produce the same level of scattering at more extreme angles and show up less severe in the "dust" image or are absent altogether. Thus, the resulting image preferentially highlights dust as regions of higher pixel intensity compared with real surface defects.

The additional information from the "dust" image channel can be evaluated by the evaluation unit (not shown) for various applications. For example, one application could be to inspect the surface of the specimen 205 for "cosmetic" defects or functional defects on the surfaces by being less sensitive to dust or any other contamination. Another application is possible to make sure that the surface is clean before processing begins. This could be the case, for example, if the surface of the specimen is coated subsequent to the inspection for defects. In other words, independent from the determination of defects (which would exclude the specimen from being coated altogether) one might want to know if the surface of the specimen 205 is contaminated by particles, for example, which would require an extra cleaning step before coating.

In evaluating the deflectometry or PSD input data and the "dust" channel input data, the processor of the evaluation unit executes program code that allows a comparison of the images of the "dust" channel with the images of the deflectometry channel. If, e.g., the defect is not visible in the "dust" channel image, it can be determined that the defect recognized in the deflectometry channel image is indeed a defect. In addition to a mere comparison of images, machine learning techniques may be employed that analyze the data in both channels even without comparison to determine whether an object on the surface of the specimen 205 is a defect or a contamination based on an instantaneous decision-making process. Of course, any decision can also generally be made by a user looking at the images and by storing the result in the memory of the evaluation unit which can also be used to train the algorithm executed by the processor of the evaluation unit.

Figure 3A:
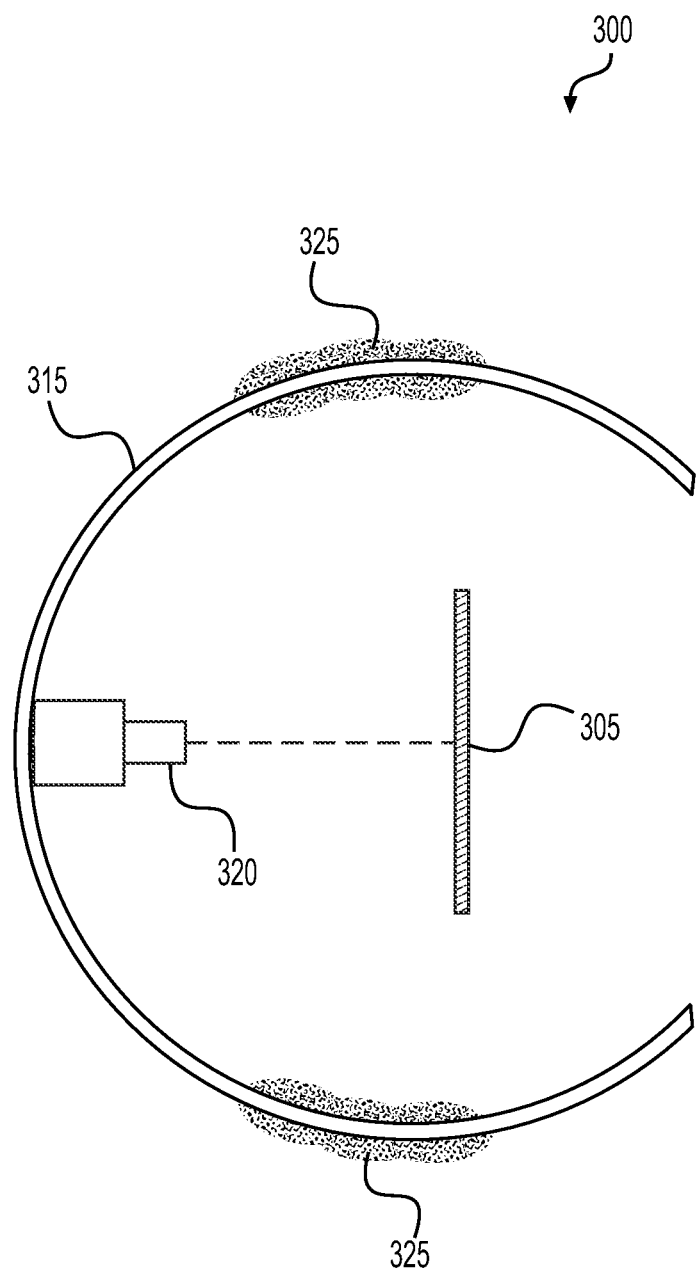
FIG. 3A shows a schematic illustration of a front view of a surface inspection system according to an exemplary embodiment of the disclosure.
Figure 3B:
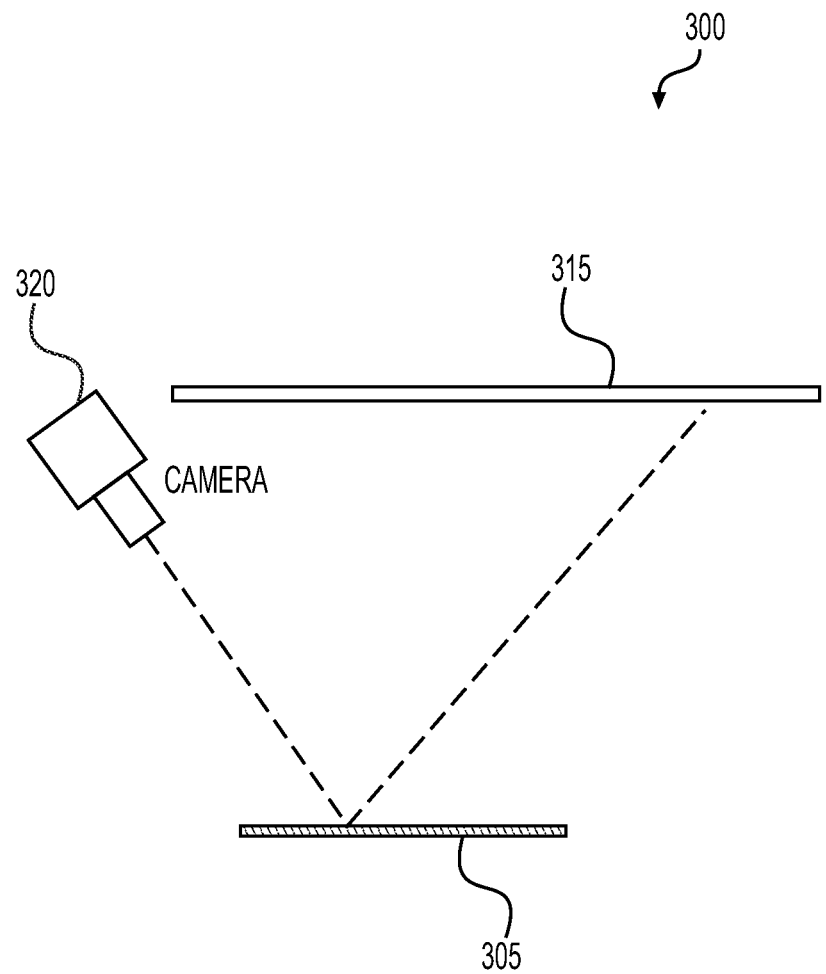
FIG. 3B shows a schematic illustration of a side view of a surface inspection system according to an exemplary embodiment of the disclosure.

FIGS. 3A and 3B show schematic illustrations of a front view and a side view, respectively, of a surface inspection system 300 according to an exemplary embodiment of the disclosure. The surface inspection system 300 includes tube member 315 and image recording device 320 arranged at a predetermined angle relative to the surface of the specimen 305. The tube member 315 includes an array of LEDs and a predefined subset of the LEDs 325 that are located at predetermined angles relative to the surface of the specimen 305 are turned on to illuminate the surface of the specimen 305 for obtaining a "dust" channel image by the image recording device 320.

Specifically, as shown in FIG. 3A, the image recording device 320 is taking an image from the side surface of the specimen 305 and the side surface of the specimen 305 is illuminated from the top and the bottom by the predefined subset of the LEDs 325. It is possible to illuminate the side surface of the specimen 305 only from the top or only from the bottom. Any of these illuminations, either from two directions or from one direction allows the light on the side surface of the specimen 305 to be "glancing" or "glowing".

Figure 4A:
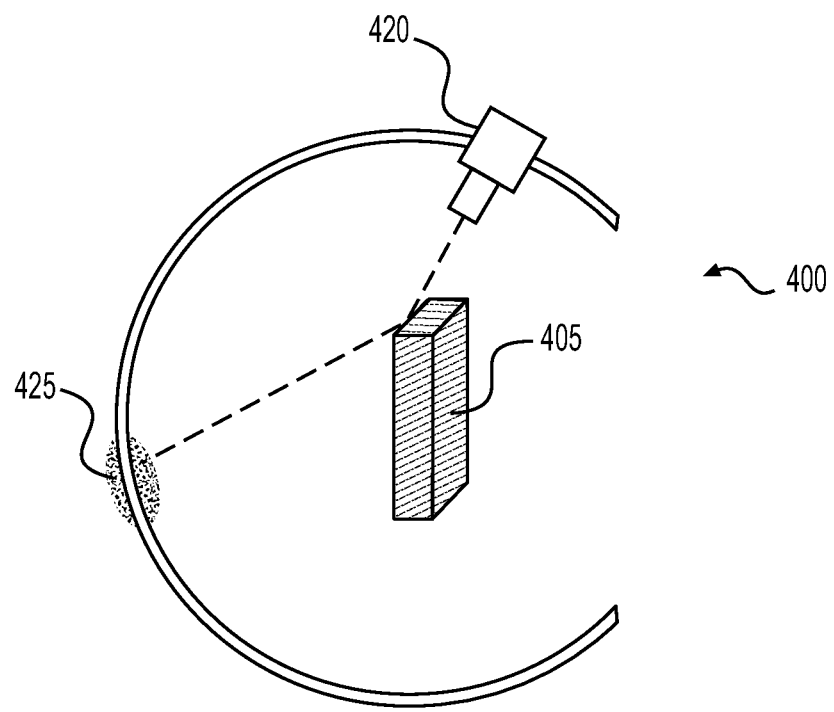
FIG. 4A shows a schematic illustration of a front view of a surface inspection system according to another exemplary embodiment of the disclosure.

FIG. 4A shows a schematic illustration of a front view of a surface inspection system 400 according to another exemplary embodiment of the disclosure. In the exemplary embodiment, the top surface of the specimen 405 is inspected. In this case, the image recording device 420 records a "dust" image at an angle from the top surface and a predefined subset of LEDs 425 illuminates the top surface of the specimen 405 at a predefined angle from the side.

Figure 4B:
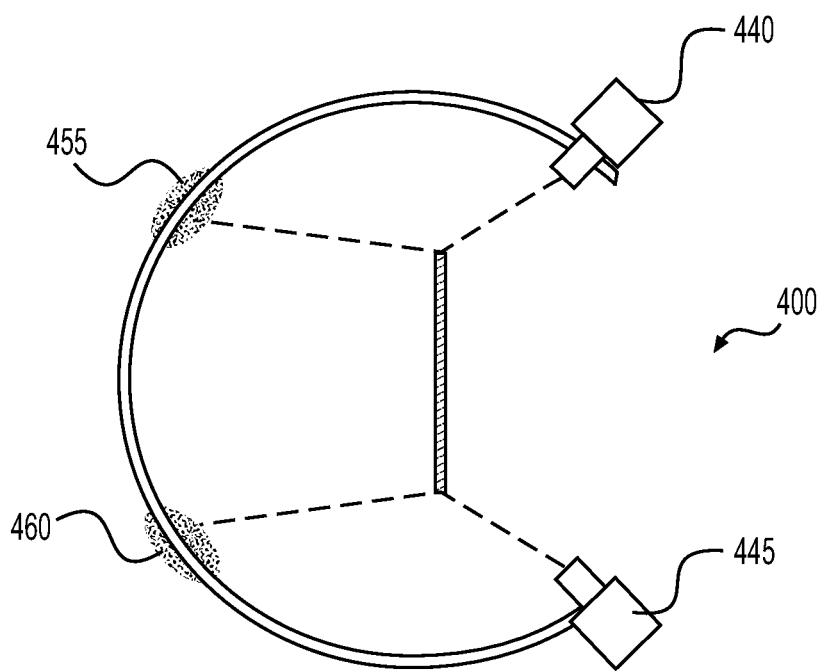
FIG. 4B shows a schematic illustration of a front view of a surface inspection system according to a further exemplary embodiment of the disclosure.

Similarly, as shown in FIG. 4B, a "slim" specimen is shown of which "dust" images are taken simultaneously from the top and bottom surfaces of the specimen 405 which are illuminated by respective predefined subsets of LEDs 455 and 460.

FIGS. 5A to 5C show experimental data showing a comparison of a scratch 505 to a fiber 510 on the surface of the specimen 205. It can be clearly be seen that the scratch 505 is non-visible in the Dust image channel (FIG. 5C) while both the fiber 510 and scratch 505 are clearly present in the PSD grayscale image (FIG. 5A) and in the PSD amplitude image (FIG. 5B). As shown in FIGS. 5A and 5B, there appear to be multiple scratches 505 in these images because the surface is transparent and thus back surface and top surface reflections are present.

The dust image data (FIG. 5C) can now be correlated or combined with the PSD Grayscale image data (FIG. 5A)

and/or with the PSD amplitude image data (FIG. 5B) to create a separation between the dust (fiber 510) and the defect (scratch 505).

While the "dust" image data, i.e., the "dust" images, and the deflectometry or PSD input data, i.e., the deflectometry images, are sequentially taken, the "dust" image can be taken at any point in time during this sequence. In other words, it is possible that the "dust" image is taken first, and the deflectometry image(s) is/are subsequently taken. However, it is also possible that the "dust" image is taken between any of the deflectometry image(s) or after all of the deflectometry images are taken.

FIG. 6 shows a flow chart of a method 600 for differentiating particulate contamination from defects on a surface of a specimen to be inspected according to an exemplary embodiment of the disclosure. At 605, deflectometry or PSD input data is generated. This can be image data recorded by the image recording device 220. In parallel, or sequentially, at 610, "dust" channel input data is generated by the image recording device 220. Each of the deflectometry or PSD input data and the "dust" channel input data is recorded with a different illumination setting and provided to the evaluation unit. At 615, the evaluation unit correlates the deflectometry or PSD input data and the "dust" channel input data which is taken in very short succession. By correlating the deflectometry or PSD input data and the "dust" channel input data, information of the two separate channels of information are merged. The evaluation unit may apply various algorithms to identify defects and defect locations and contamination and the location of the contamination on the surface of a specimen 205. These algorithms include, but are not limited to, elimination, mathematical analysis, machine learning that processes bot inputs at the same time and generate respective output data. Specifically, at 620, the evaluation unit outputs defect identification information and a corresponding location information for the defect. At 625, the evaluation unit outputs dust or contamination identification information and location information for the dust or contamination. The evaluation unit also might only input defect or dust information if one only is desired by the end user and simply forgo the reminder of the information irrelevant for the test.

The dust or contamination identification information and location information for the dust or contamination can be generated based on raw image data or based on pre-processed image data, such as the data of the images shown in FIGS. 5A and 5B.

Figure 7:
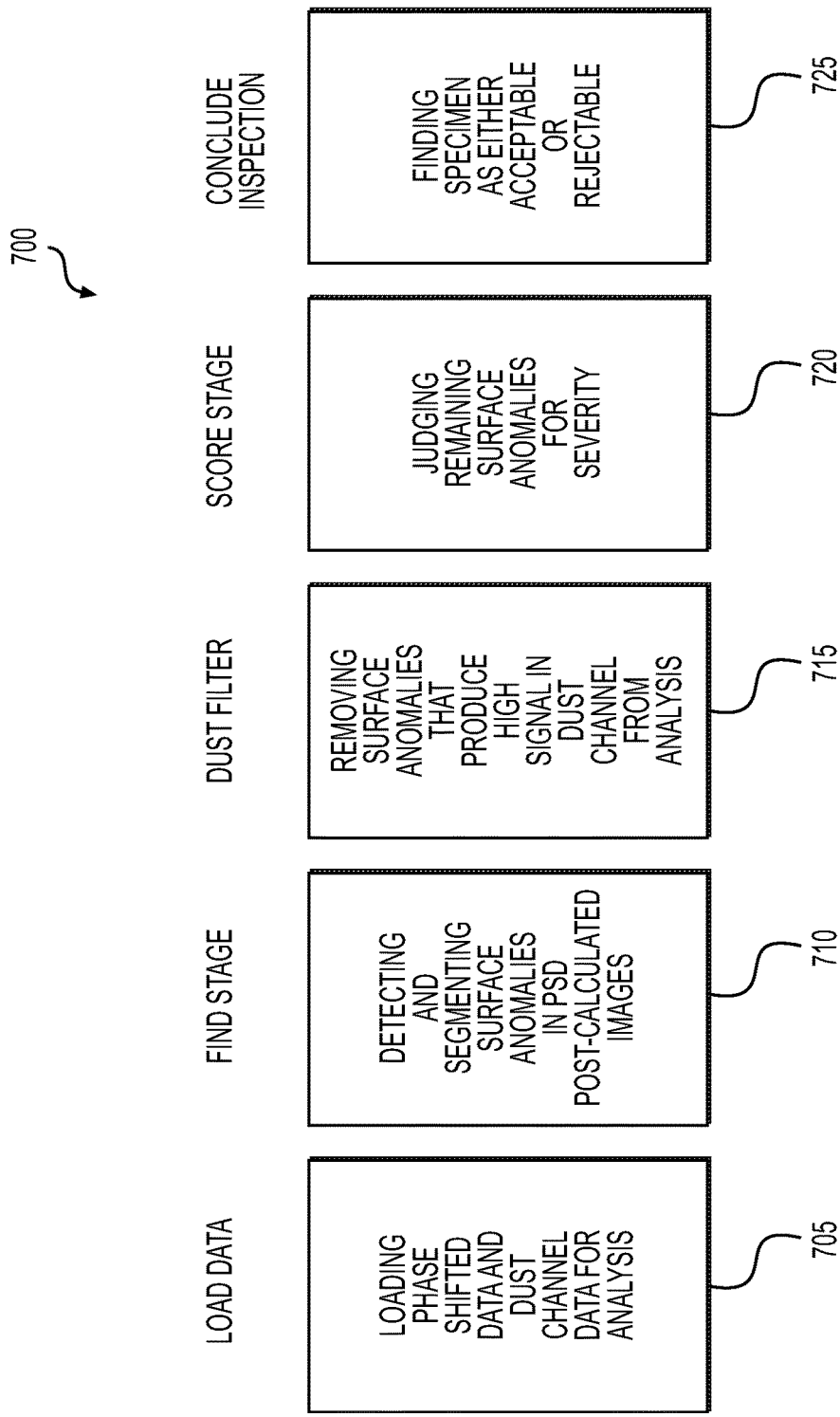
FIG. 7 shows a flow chart of a method for differentiating particulate contamination from defects on a surface of a specimen to be inspected according to another exemplary embodiment of the disclosure.

FIG. 7 shows a flow chart of a method for differentiating particulate contamination from defects on a surface of a specimen to be inspected according to another exemplary embodiment of the disclosure.

The method begins at 705, at which phase shifted data and dust channel data are loaded for analysis into a memory of the evaluation unit. At 710, surface anomalies are detected and segmented in post-calculated images such as shown, e.g., in FIGS. 5A and 5B. At 715, surface anomalies that produce high signal in the dust channel are removed from the analysis. At 720, remaining surface anomalies are judged for severity. The method ends at 725 with a finding the specimen to be either acceptable or rejectable.

The flow chart shown in FIG. 7 is just one further exemplary embodiment of the method for differentiating particulate contamination from defects on a surface of a specimen, but the method is not limited thereto. There might be many other ways of how the data might flow. For example, it is also possible to detect defects first or to detect dust first, or to detect both in parallel by subtracting, etc.

The term "comprising" (and its grammatical variations) as used herein is used in the inclusive meaning of "having" or "including" and not in the exclusive sense of "consisting only of." The terms "a" and "the" as used herein are understood to encompass the plural as well as the singular.

It is understood that the foregoing description is that of the exemplary embodiments of the disclosure and that various changes and modifications may be made thereto without departing from the spirit and scope of the disclosure as defined in the appended claims.

What is claimed is:

1. An inspection system for differentiating particulate contamination from defects on a surface of a specimen, the system comprising:
    an illumination source configured to illuminate the specimen with a light at a predetermined angle relative to the surface of the specimen;
    an image recording device configured to capture the light reflected from the surface of the specimen in a sensor image to generate phase-shifted deflectometry (PSD) image data and dust channel image data;
    a controller in communication with the illumination source and the image recording device and configured to:
    receive the PSD image data and the dust channel image data from the image recording device,
    correlate the PSD image data and the dust channel image data, and
    separately output first result information and second result information, the first result information including defect identification information and defect location information and the second result information including contamination identification information and contamination location information,
    wherein at least one of:
    (1) the PSD image data includes a plurality of deflectometry images, and the dust channel image data includes a dust image,
    the controller is further configured to:
    control the image recording device to capture the plurality of deflectometry images in a sequence and to capture the dust image at a predetermined point in time during the sequence,
    (2) the PSD image data includes the plurality of deflectometry images, and the dust channel image data includes a plurality of dust images,
    the controller is further configured to:
    control the image recording device to capture the plurality of deflectometry images in the sequence and to capture one of the plurality of dust images between any of the plurality of deflectometry images, or
    (3) the image recording device includes a plurality of cameras,
    the plurality of cameras is configured as at least one of area scan cameras and line scan cameras,
    when the plurality of cameras is configured as the area scan cameras, the specimen is held in a static position when the light reflected from the surface of the specimen is captured, and
    when the plurality of cameras is configured as the line scan cameras, the specimen is moved with a stage or a robot.

2. The inspection system of claim 1, wherein the controller is configured to at least one of:
    control the image recording device to capture the deflectometry images before capturing the dust image, and control the image recording device to capture the deflectometry images subsequent to capturing the dust image.

3. The inspection system of claim 1, wherein:
the illumination source includes a plurality of light sources, and
to generate the dust channel image data, one or more light sources of the illumination source is/are configured to illuminate the specimen at at least one glancing angle which produces glancing angle illuminations to the surface of the specimen to induce particles to glow.

4. The inspection system of claim 3, wherein the plurality of light sources is an array of light sources and the one or more light sources are selected from the array of light sources.

5. A method for differentiating particulate contamination from defects on a surface of a specimen, the method comprising:
illuminating the specimen with a light of an illumination source at a predetermined angle relative to the surface of the specimen;
capturing the light reflected from the surface of the specimen in a sensor image to generate PSD image data and dust channel image data by an image recording device;
receiving the PSD image data and dust channel image data from the image recording device,
correlating the PSD image data and dust channel image data, and
separately or together outputting first result information and second result information, the first result information including defect identification information and defect location information and the second result information including contamination identification information and contamination location information,
wherein at least one of:
(1) the PSD image data includes a plurality of deflectometry images, and the dust channel image data includes a dust image,
the method further comprises controlling the image recording device to capture the plurality of deflectometry images in a sequence and to capture the dust image at a predetermined point in time during the sequence, or
(2) the image recording device includes a plurality of cameras,
the plurality of cameras is configured as at least one of area scan cameras and line scan cameras,
when the plurality of cameras is configured as the area scan cameras, the specimen is held in a static position when the light reflected from the surface of the specimen is captured, and
when the plurality of cameras is configured as the line scan cameras, the specimen is moved with a stage or a robot.

6. The method of claim 5, further comprising:
controlling the image recording device to capture the deflectometry images before capturing the dust image, and
controlling the image recording device to capture the deflectometry images subsequent to capturing the dust image.

7. The method of claim 5, wherein:
the PSD image data includes the plurality of deflectometry images, and the dust channel image data includes a plurality of dust images, and
the method further comprises controlling the image recording device to capture the plurality of deflectometry images in a sequence and to capture one of the plurality of dust images between any of the plurality of deflectometry images.

8. The method of claim 5, wherein:
the illumination source includes a plurality of light sources, and
to generate the dust channel image data, one or more light sources of the illumination source is/are configured to illuminate the specimen at at least one glancing angle which produces glancing angle illuminations to the surface of the specimen to induce particles to glow.

9. The method of claim 8, wherein the plurality of light sources is an array of light sources and the one or more light sources are selected from the array of light sources.

10. A non-transitory computer readable storage medium encoded with a program code stored thereon that when executed by a processor, causes the processor to:
illuminate a specimen with an illumination source with a light at a predetermined angle relative to a surface of the specimen;
capture the light reflected from the surface of the specimen in a sensor image to generate PSD image data and dust channel image data by an image recording device;
receive the PSD image data and dust channel image data from the image recording device,
correlate the PSD image data and dust channel image data, and
separately or together output first result information and second result information, the first result information including defect identification information and defect location information and the second result information including contamination identification information and contamination location information,
wherein at least one of:
(1) the PSD image data includes a plurality of deflectometry images, and the dust channel image data includes a dust image,
the program code further causes the processor to control the image recording device to capture the plurality of deflectometry images in a sequence and to capture the dust image at a predetermined point in time during the sequence,
(2) the program code further causes the processor to:
control the image recording device to capture the plurality of deflectometry images before capturing the dust image, and
control the image recording device to capture the plurality of deflectometry images subsequent to capturing the dust image,
(3) the PSD image data includes the plurality of deflectometry images, and the dust channel image data includes a plurality of dust images, and
the program code further causes the processor to control the image recording device to capture the plurality of deflectometry images in the sequence and to capture one of the plurality of dust images between any of the plurality of deflectometry images, or
(4) the PSD image data includes the plurality of deflectometry images, and the dust channel image data includes the plurality of dust images, and
the program code further causes the processor to control the image recording device to capture the plurality of deflectometry images in the sequence and to capture one of the plurality of dust images between any of the plurality of deflectometry images.

11. The non-transitory computer readable storage medium of claim 10, wherein:

the illumination source includes a plurality of light sources, to generate the dust channel image data, one or more light sources of the illumination source is/are configured to illuminate the specimen at at least one glancing angle which produces glancing angle illuminations to the surface of the specimen to induce particles to glow, and the plurality of light sources is an array of light sources and the one or more light sources are selected from the array of light sources.

* * * * *